US008488826B2

(12) United States Patent
Danley

(10) Patent No.: US 8,488,826 B2
(45) Date of Patent: Jul. 16, 2013

(54) HORN ENCLOSURE FOR COMBINING SOUND OUTPUT

(76) Inventor: Thomas J. Danley, Highland Park, IL (US)

( * ) Notice: Subject to any disclaimer, the term of this patent is extended or adjusted under 35 U.S.C. 154(b) by 96 days.

(21) Appl. No.: 13/135,045

(22) Filed: Jun. 23, 2011

(65) Prior Publication Data

US 2012/0328140 A1 Dec. 27, 2012

(51) Int. Cl.
*H04R 1/20* (2006.01)
*G10K 11/00* (2006.01)

(52) U.S. Cl.
USPC ............................ 381/342; 381/339; 181/177

(58) Field of Classification Search
USPC .................. 381/339–342, 345, 351; 181/177, 181/179, 182, 187–189, 192
See application file for complete search history.

(56) References Cited

U.S. PATENT DOCUMENTS 5,146,508 A * 9/1992 Bader et al. .................. 381/342
6,516,076 B1 * 2/2003 Marlin .......................... 381/340
8,265,320 B2 * 9/2012 Datz et al. .................... 381/341

OTHER PUBLICATIONS

Bjorn Kolbrek, Horn Theory: An Introduction Part 2, 2008, audioXpress.*

* cited by examiner

*Primary Examiner* — Brian Ensey
*Assistant Examiner* — Norman Yu
(74) *Attorney, Agent, or Firm* — Olson & Cepuritis, Ltd.

(57) ABSTRACT

A horn enclosure combines sound output emanating from a plurality of acoustic drivers. The horn enclosure includes a plurality of sound input plenums, a plurality of flow passageways, and a common sound output chamber. Each of the input plenums is coupled to an acoustic driver for receiving generated sound output from the associated driver. A plurality of partitions defining the plurality of flow passageways provides for a plurality of acoustic paths from each acoustic driver and through the input plenum. The common sound output chamber is in acoustic communication with each plenum through respective flow passageways and has a sound output opening for passage of the combined sound output.

16 Claims, 11 Drawing Sheets

HORN ENCLOSURE FOR COMBINING SOUND OUTPUT

FIELD OF THE INVENTION

The present invention relates to a sound reproduction system for use with multiple acoustic drivers, in particular, combining sound output from multiple drivers coherently for improved frequency response, phase response, and efficiency.

BACKGROUND OF THE INVENTION

Acoustic drivers are often used in conjunction with sound-radiating horns in sound applications requiring high acoustic power output or sound volume, such as in theaters, arenas, or for studio and stage monitoring, and the like. In many sound systems, separate components such as driver and horn assemblies or conventional sound enclosure loudspeakers are used for sound reproduction across the entire range of audible sound, with different devices covering the bass, midrange and high frequency portions of the audible spectrum.

A particular sound application may require an especially high power output across the spectrum. With respect to the high frequency range, this has been attempted in the past in at least two different ways. A first attempt included an increase of the number of high frequency driver and horn assemblies. When multiple drivers are used, the output increases. For example, if four drivers are combined, the output power increases and causes an increase in perceived loudness. Thus, one could attempt to line up a series of high frequency drivers each connected to horn assemblies to provide the high-powered output. This solution, however, results in destructive interference and requires too large a space for many applications.

Second, it may be possible to use a system of multiple drivers coupled with a single horn. In particular, this would result in less bulk, lower weight, lower cost than having several sound sources operating at the same time. It is difficult, however, to properly combine multiple drivers with a single horn, especially when high frequencies are concerned. Ideally, the distance between the multiple drivers would be less than ⅓ the wavelength of the highest frequency to avoid sound wave interference. At high frequencies, the sound wavelength can be very small, therefore making it difficult to place the drivers at a distance less than the wavelength. For example, the approximate one-third wavelength at a frequency of 10 kHz is 0.44 inches. Given that drivers oftentimes have a diameter of approximately 4 inches or more, it would not be possible to put two or more drivers next to one another at less than 0.44 inches. In other words, any meaningful design of the horn enclosure would require the depth to be so large as to be impractical.

There have been various attempts to combine multiple acoustic drivers with a single horn. One attempt was to use a "Y" combiner. The "Y" combiner includes a "Y" shaped throat with a separate branch attached to each driver. Sound is generated by the acoustic drivers and flows down each separate branch and at meets at the combined throat portion. At high frequencies, however, the multiple sound waves meet together and may cancel each other out or create substantial interference.

Another attempt to combine multiple high frequency drivers with a single horn was to use an Electrovoice Manifold. The Electrovoice Manifold attempted to eliminate sound wave interference from multiple drivers by reflecting each sound wave at a reflecting surface so as to combine with the other sound waves with minimal interference. Reflection of sound waves, however, is largely unpractical in these circumstances. For proper reflection of a wave, the reflector must be large relative to the actual wavelength. In some examples, the reflector must be at least 20 wavelengths long to be effective. When dealing with high frequency of sound, wavelengths may range from ⅝ inch to a few inches, thus requiring very large reflectors. Oftentimes, it would be impractical to use such a large reflector.

It is also desirable to form a properly shaped wavefront to efficiently couple with the horn portion. When a plane wave from a relatively large source is coupled to a horn, the dimension of the source ends up controlling the high frequency radiation pattern rather than the more desirable outcome of the horn controlling the radiation pattern. It is therefore desirable to create a curved wavefront, such as one having the form of a segment of a sphere, rather than a flat wavefront to couple with the horn.

The Paraline system, described in U.S. Patent Publication 2009/0323997 to Danley discloses a method of combining the output of two or more acoustic drivers into one coherent output. The Paraline system, however, produces a wavefront that may not be optimal for coupling with the shape of the horn and can produce a curved wavefront only in a simple plane.

Accordingly, a sound reproduction system for efficiently combining sound output from multiple compression drivers with a horn mouth portion would be advantageous.

SUMMARY OF THE INVENTION

The present invention provides a novel and improved sound reproduction system that combines sound output generated from multiple acoustic drivers coherently with a single horn and produces a wavefront that is a segment of a sphere, and minimizes wind as a factor in outdoor installations as well. The sound reproduction system includes a sound enclosure defining a horn passageway for passage of sound output to a horn mouth region. The sound enclosure includes input openings for at least two acoustic drivers and a common sound output opening that is in communication with the horn mouth region.

The sound enclosure defines a plurality of sound input plenums, a plurality of parallel partitions forming flow passageways, and a common sound output chamber. An acoustic driver is coupled to each input opening for generating and distributing sound output into a corresponding sound input plenum. A particular set of flow passageways are adjacent to and in communication with each of the plurality of sound input plenums and provide for a plurality of independent acoustic paths from each acoustic driver through the plenum and the respective set of flow passageways.

Sound output generated by each acoustic driver may travel along each of the plurality of independent acoustic paths by passing into each sound input plenum and then separating and passing through the plurality of flow passageways. The separated sound output emanates from each of the flow passageways into the common sound output chamber and reconstructs to form the original sound output. Meanwhile, sound output from other acoustic drivers emanates from other flow passageways into the common sound output chamber and the respective sound outputs merge with one another to form a single combined wavefront with little distortion or interference. The end result is a combined sound output from multiple acoustic drivers forming a singular and relatively larger sound output.

The sound enclosure can be constructed from a plurality of layered plates. An outer sound input plate may have sound input openings coupled to each of the multiple acoustic drivers. An outer sound output plate may have a sound output opening for outputting the combined sound output to the horn mouth region. The sound enclosure also includes a plurality of adjacent core plates located between the outer sound input plate and the outer sound output plate. Each of the plurality of adjacent core plates have cutout portions configured to form at least a portion of the plurality of sound input plenums, the plurality of flow passageways, and the common sound output chamber.

To provide maximum efficiency, the sound reproduction system controls the high frequency radiation pattern exiting the acoustic drivers. The wavefront entering the horn mouth portion therefore preferably is a segment of a sphere. To create a wavefront having a spherical segment, the total area of the acoustic paths is divided or partitioned into sections to progressively delay the appropriate portions of the wave so as to provide acoustic paths of uneven length for forming the desired curvature. The delay is accomplished by making consecutive portions of each acoustic path appropriately longer.

DETAILED DESCRIPTION OF THE PREFERRED EMBODIMENTS

The invention disclosed herein is, of course, susceptible of embodiment in many different forms. Shown in drawings and described herein below in detail are the preferred embodiments of the invention. It is understood, however, that the present disclosure is an exemplification of the principles of the invention and does not limit the invention to the illustrated embodiments.

For ease of description, sound reproduction systems embodying the present invention are described herein below in their usual assembled position as shown in the accompanying drawings and terms such as front, rear, upper, lower, horizontal, longitudinal, etc., may be used herein with reference to this usual position. However, the sound reproduction systems may be manufactured, transported, sold, or used in orientations other than that described and shown herein.

Figure 1:
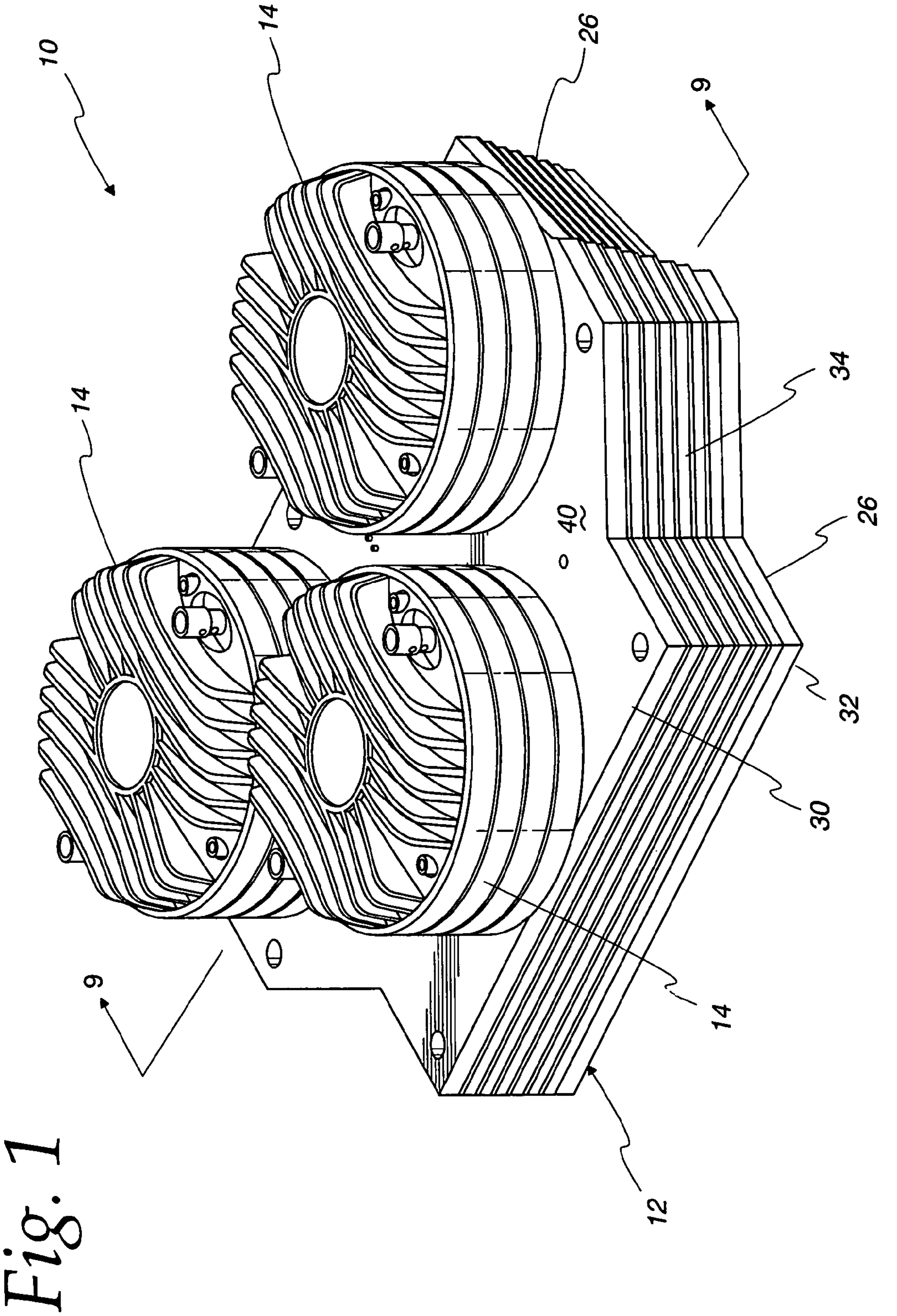
FIG. 1 is a bottom perspective view of a horn enclosure and multiple acoustic drivers illustrating the present invention.
Figure 2:
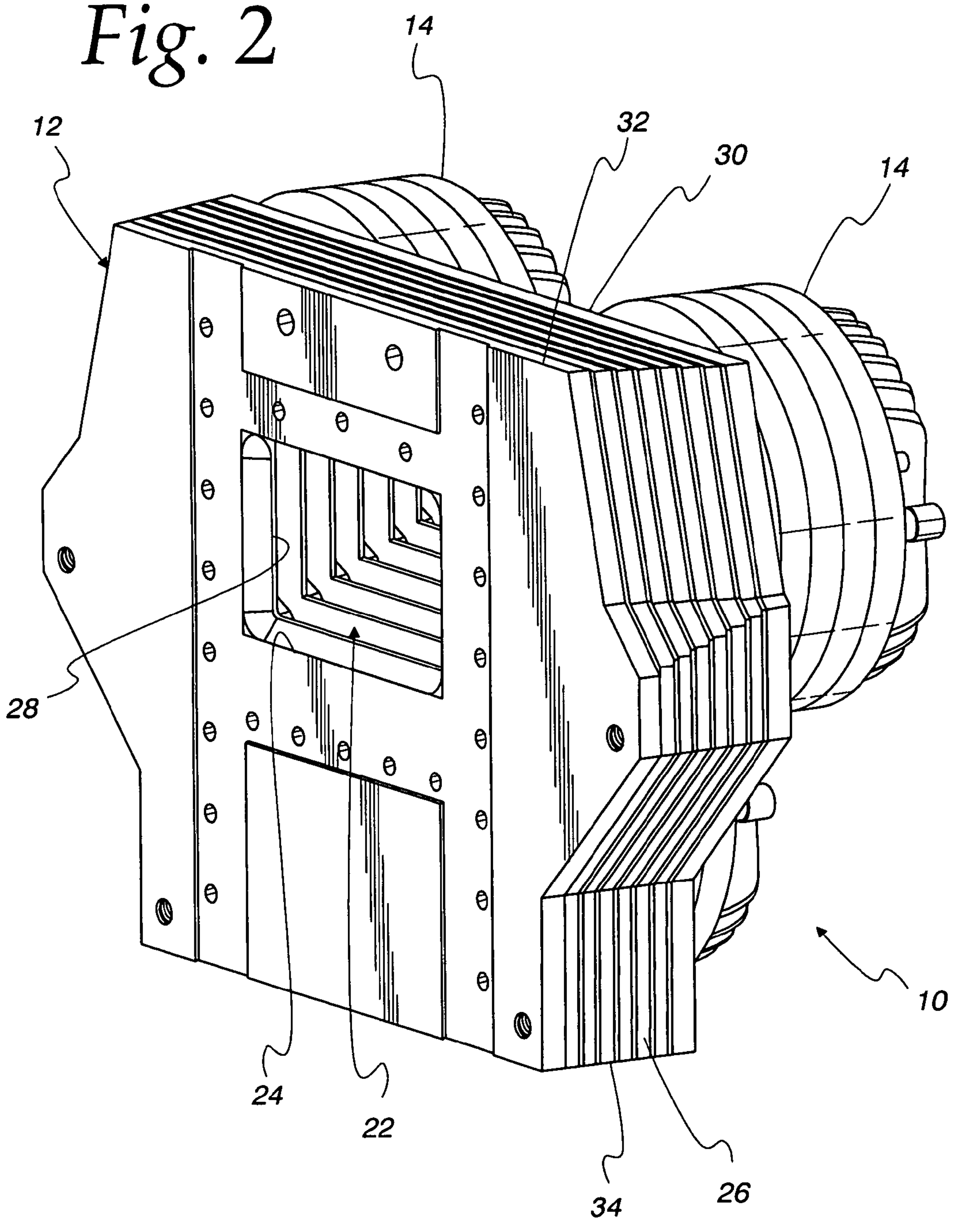
FIG. 2 is a top perspective view of the horn enclosure and the multiple acoustic drivers illustrating the present invention.

Referring to FIGS. 1 and 2, a sound reproduction system 10 is shown embodying certain aspects of the present invention. Included is a horn enclosure 12 for providing acoustic loading for the sound output of multiple acoustic drivers. For purposes of this invention, the disclosure will show the horn enclosure 12 configured to provide acoustic loading to multiple acoustic drivers 14. It should be appreciated that the horn enclosure 12 can be constructed to function with virtually any plurality of acoustic drivers. The horn enclosure 12 may also have many different shapes, sizes and configurations depending on a variety of factors including the type and number of acoustic drivers used in the sound reproduction system.

The horn enclosure 12 is adapted for combining sound output generated by a plurality of acoustic drivers 14. The enclosure 12 includes a plurality of sound input plenums 20 (FIG. 9) defined in part by outer sound input plate 30, a plurality of partitions 26 defining flow passageways 28, and a common sound output chamber 22. Each of the plurality of sound input plenums 20 is associated with an individual acoustic driver and adapted to receive sound output from the associated driver. Each plenum 20 includes a chamber for receiving the generated sound output and distributing portions of the sound output to a particular set of adjacent flow passageways 28. The common sound output chamber 22 is in acoustic communication with each of the plurality of plenums 20 through the respective adjacent flow passageways 28 and also includes a single sound output opening 24 for exit passage of the combined sound output.

Sound output generated by each of the acoustic drivers 14 travels along a plurality of independent acoustic paths defined by the plurality of sound input plenums 20, the plurality of flow passageways 28, and the common sound output chamber 22. In operation, an acoustic driver 14 generates sound output that progresses away from the driver 14 and enters the input plenum 20 along a plurality of acoustic paths. The sound output emanates into the plurality of flow passageways 28 and separates along each of the individual acoustic paths. Depending on the configuration of the flow passageways 28, the sound output may travel around curved portions of the horn enclosure 12 as it passes from the input plenum 20, through the plurality of flow passageways 28, and into the common sound output chamber 22. For sound output to efficiently bend around a corner, there is a specific relationship between flow passageway dimension, the wavelength of the highest sound output frequency, and the angle of bend. To pass sound without interference, the width of the flow passageway must be less than one-third the wavelength at the highest frequency of interest. Above this frequency, the mixing of energy greater than about one-third wavelength apart in passage results in periodic cancellation and interference. Once through the flow passageways 28, the sound output is distributed to the common sound output chamber 22 along each individual acoustic path and is reconstructed to form the sound output originally generated by the acoustic driver 14.

Meanwhile, sound output from other acoustic drivers 14 coupled to the horn enclosure 12 travels similarly along other sets of individual acoustic paths, enters the common sound output chamber 22, and are reconstructed in a similar fashion as described above. This output is combined with other sound output at the sound output chamber 22 and exits the horn enclosure 12 through the sound output opening 24 as a singular merged sound output. As a result, multiple sound outputs from a plurality of acoustic drivers are combined to form a singular larger sound output with little interference and distortion.

Figure 3:
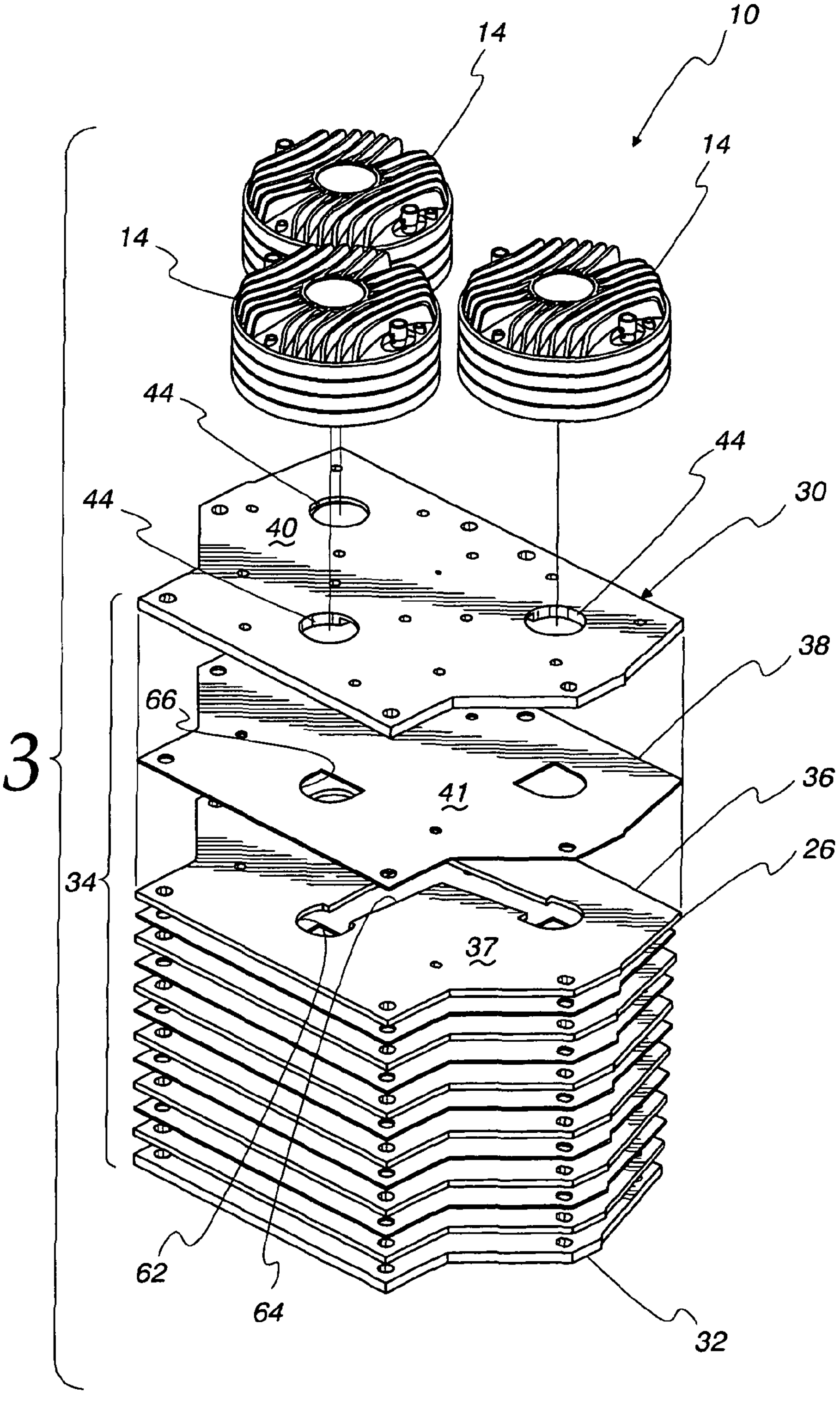
FIG. 3 is a partially exploded view of the horn enclosure and the multiple acoustic drivers illustrating the present invention.

In the preferred embodiment, the horn enclosure 12 is constructed by joining a stack of layered plates together as illustrated in FIG. 3. Included in the stack of layered plates are outer sound input plate 30, outer sound output plate 32, and a plurality of adjacent core plates 34. The outer sound input plate 30 and the outer sound output plate 32 may be defined by the horn enclosure 12 and spaced a distance apart by the plurality of adjacent core plates 34.

In general, the outer sound input plate 30 is disposed between the plurality of acoustic drivers and the plurality of adjacent core plates 34. The outer sound output plate 32 is disposed adjacent the plurality of adjacent core plates 34 and defines the sound output opening 24 into an adjacent horn mouth. The outer sound input plate 30 and the outer sound output plate 32 are secured together with the neighboring plurality of adjacent core plates 34 to form a rigid sound enclosure assembly. In one example, the outer sound input plate 30 and the outer sound output plate 32 may be integral or integrally molded with the plurality of adjacent core plates 34. The stacked layered construction will be described in greater detail below.

Figure 4:
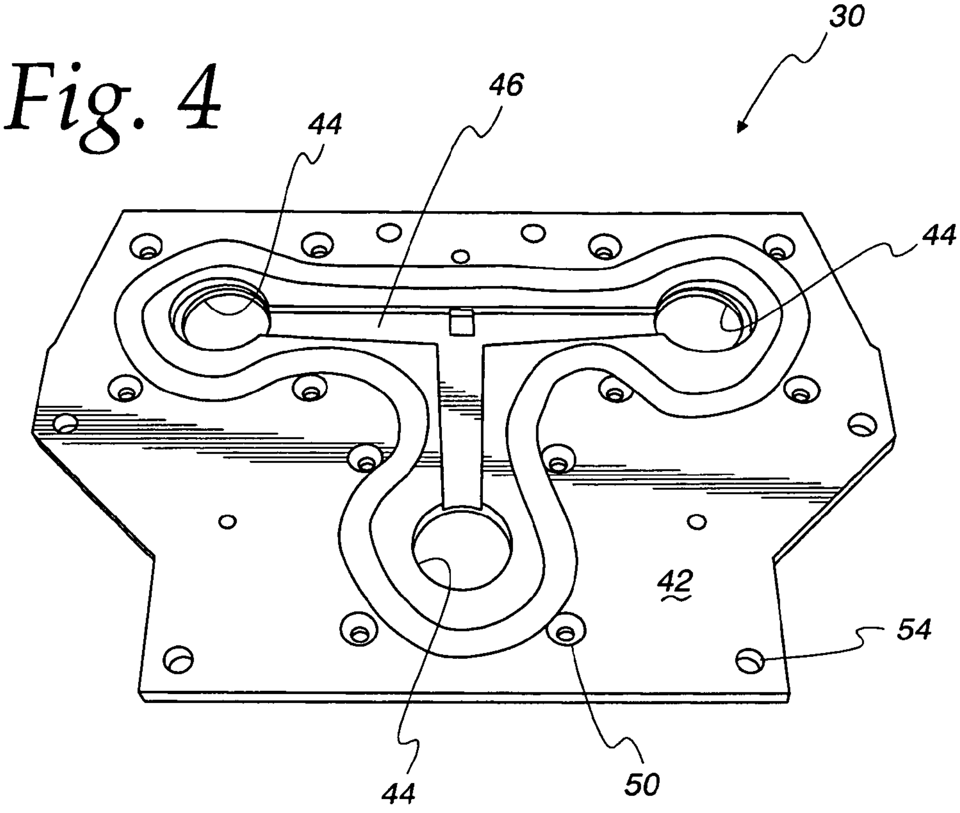
FIG. 4 is a bottom perspective view of an outer sound input plate of the horn enclosure adapted for coupling to the multiple acoustic drivers.
Figure 5:
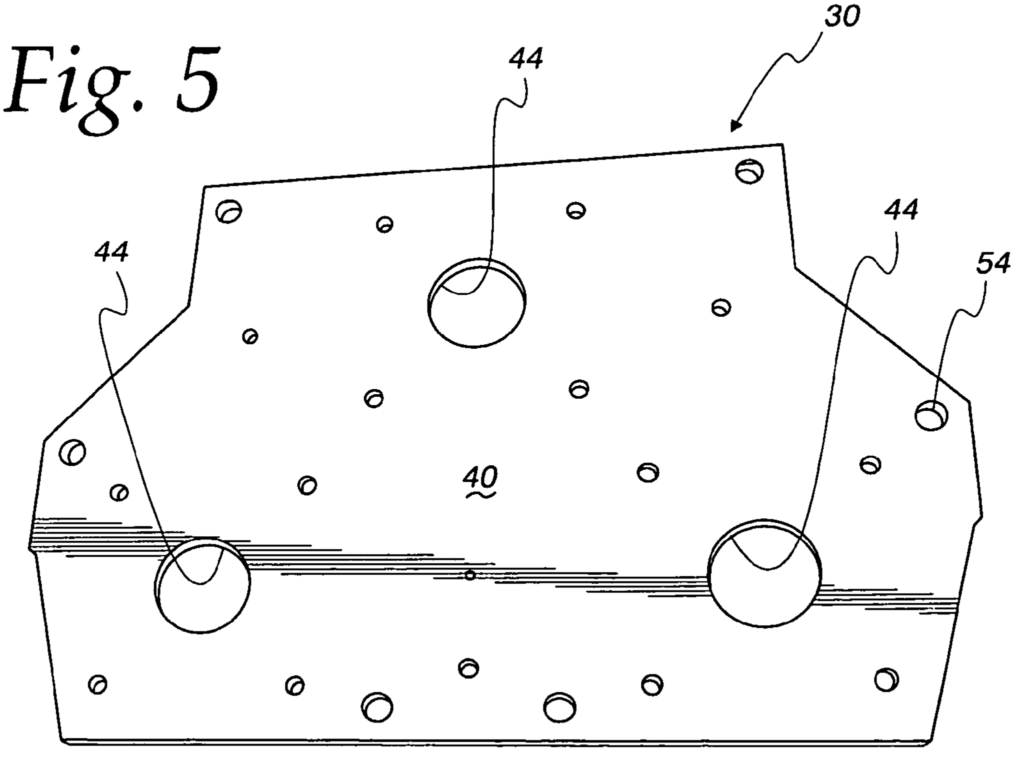
FIG. 5 is a top perspective view of the outer sound input plate shown in FIG. 4.

Referring to FIGS. 3-5, size of the outer sound input plate 30 is determined according to the external dimensions of the horn enclosure 12. The outer sound input plate 30 includes a lower exterior surface 40 for mounting the multiple acoustic drivers 14 and an upper input surface 42 for partially defining the plurality of input plenums 20, the flow passageways 28, and the common sound output chamber 22.

The outer sound input plate 30 includes driver input openings 44 permitting the passage of sound output generated by the acoustic drivers 14. The driver input openings 44 are aligned and coupled with the acoustic drivers 14 and permit the sound output from each of the acoustic drivers to enter each individual input plenum 20. Each of the driver input openings 44 has a generally circular configuration and a size that may vary depending on the shape, type, and number of acoustic drivers used in the sound reproduction system 10.

The outer sound input plate 30 also includes fastener slots 54 for securing the plurality of acoustic drivers 14 to the lower surface 40 and fastener slots 50 for securing the adjacent plates in a rigid assembly. Screws or like fasteners may be inserted through the fastener slots 54 and 50 to securely fasten the plurality of acoustic drivers and the adjacent plates to the outer sound input plate 30. It should also be appreciated that any other fastener, bolt, screw, or connector types known in the art may be used to secure the plurality of acoustic drivers 14 and the adjacent plates to the outer sound input plate 30.

Referring to FIGS. 4 and 5 in particular, the upper input surface 42 includes a plurality of channel grooves 46 in communication with driver input openings 44 and capable of providing acoustic communication to each of the plurality of input plenums 20. A plurality of the matching acoustic paths associated with each individual acoustic driver is defined in this manner. The number of grooves 46 may vary but are equal to the number of acoustic drivers present in the sound reproduction system 10. In this example, the outer sound input layer 30 includes three driver input openings 44. Three sound input plenums 20 are connected therebetween by channel grooves 46 having a trifoliate configuration.

Figure 6:
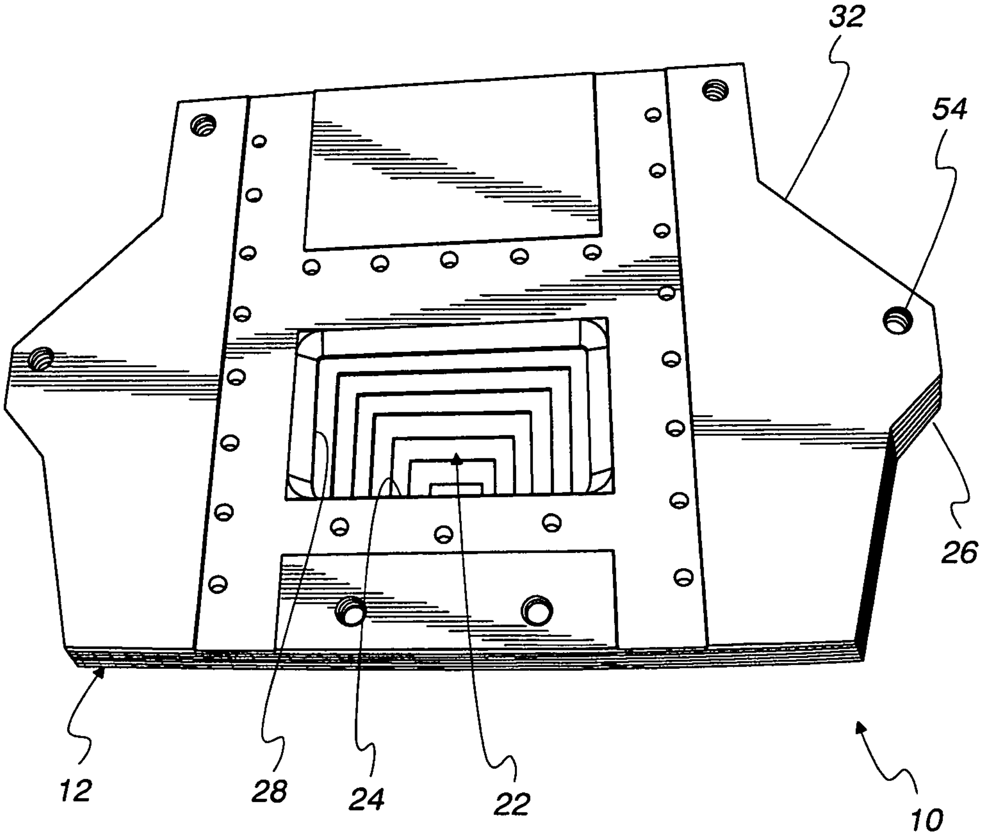
FIG. 6 is a bottom perspective view of an outer sound output plate illustrating the present invention.

The outer sound output plate 32 also conforms to the outer dimensions of enclosure 12. As shown in FIG. 6, the outer sound output plate 32 is disposed adjacent the plurality of adjacent core plates 34 and includes the sound output opening 24. Similar to above, the outer sound output plate 32 also includes fastener slots 54 for securing the adjacent plates in a rigid assembly. Screws and like fasteners may be inserted through the fastener slots 54 to securely fasten the adjacent plates to the outer sound output plate 32. It should also be appreciated that any other fasteners, bolts, screws, or connector types known in the art may be used to secure the adjacent plates to the outer sound output plate 32.

Figure 7:
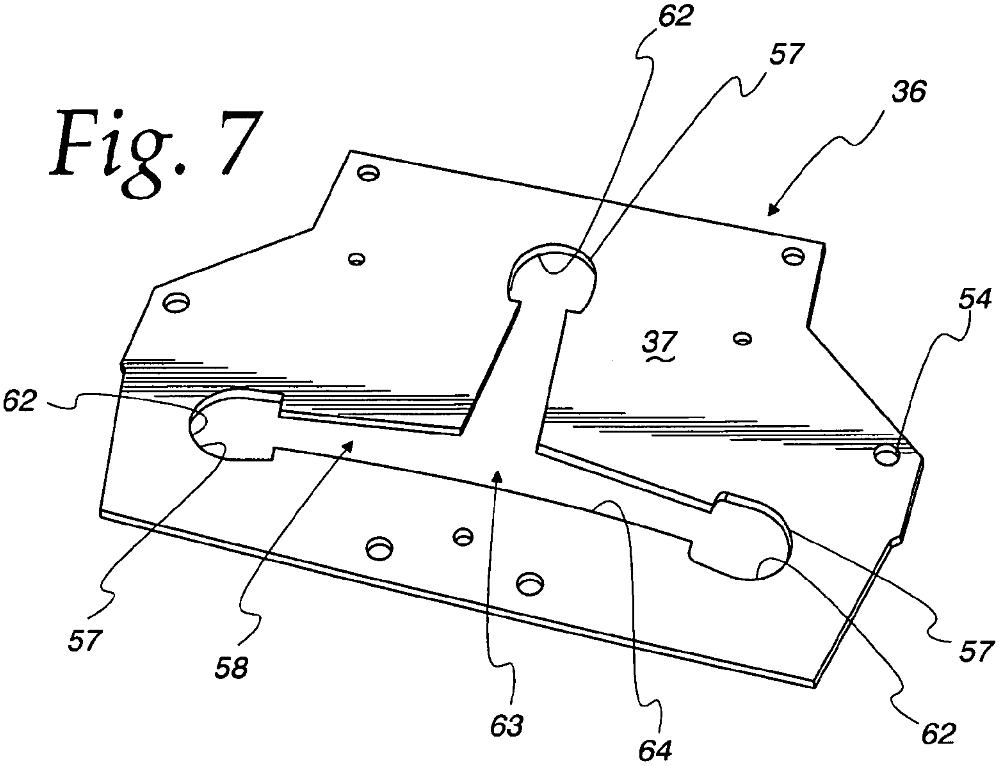
FIG. 7 is a bottom perspective view of a channel plate of the horn enclosure.
Figure 8:
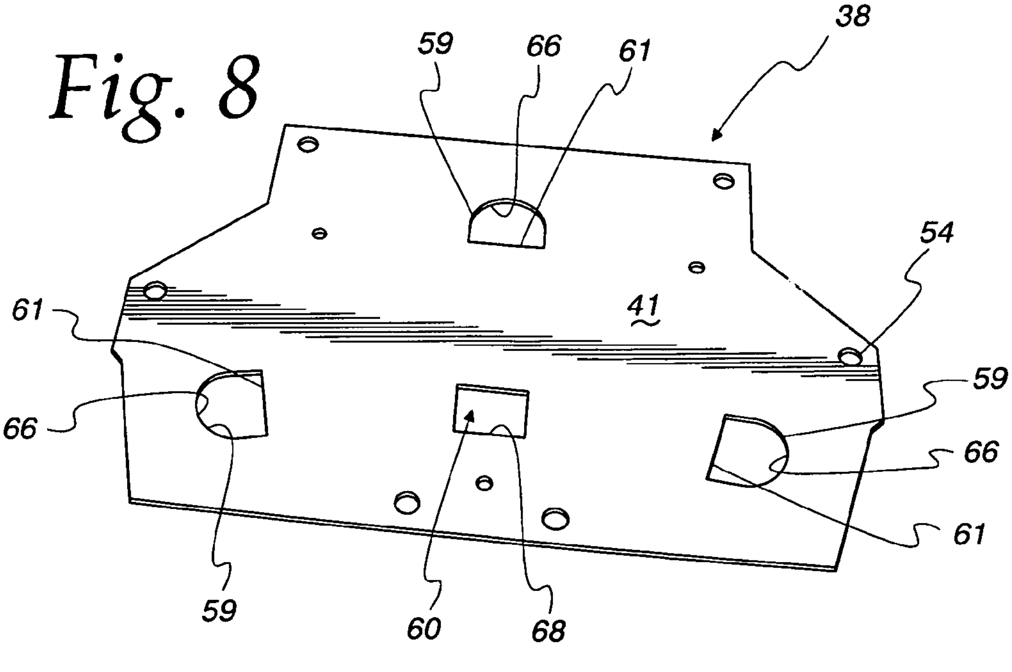
FIG. 8 is a bottom perspective view of a divider plate of the horn enclosure.

The plurality of adjacent core plates 34 may include a plurality of stacked plates having cutout portions defining the plurality of sound input plenums 20, the multiple flow passageways 28, and the common sound output chamber 22. As shown in FIGS. 7-8, the plurality of adjacent core plates 34 may include a plurality of alternating divider plates 38 and corresponding channel plates 36 of varying shapes, sizes and configurations.

Referring to FIG. 7, the channel plate 36 includes a cutout portion 58 located through an upper surface and a lower surface 37 and multiple fastener slots 50 for securing the channel plate 36 to adjacent plates. The cutout portion 58 may have many different configurations depending on the type and number of acoustic drivers used in the sound reproduction system 10. In this example, the cutout portion 58 has a generally trifoliate configuration and includes a plurality of arcuate openings 62 having a bowed configuration. Each of the arcuate openings 62 can include a curved portion 57 and be connected therebetween by open channel portions 64. In this example, the open channel portions 64 intersect together at a central inlet section 63.

The divider plate 38, as shown in FIG. 8, also includes a cutout portion 60 located through an upper surface and a lower surface 41 and multiple fastener slots 54 for securing the divider plate 38 to adjacent plates. The cutout portion 60 of the divider plate includes plurality of arcuate openings 66 having a bowed configuration and a sound inlet 68. Each arcuate opening 66 passing through the divider plate 38 can include a curved portion 59 and a lateral edge 61 disposed opposite thereof. In this example, the plurality of arcuate openings 66 and sound inlet 68 may have varying shapes and sizes and positions depending on the configuration of the horn enclosure 12 within the sound reproduction system 10. The number of arcuate openings 66 can be equal to the number of acoustic drivers 14 in the sound reproduction system 10.

In one example, the adjacent core plates 34 may be arranged so that each divider plate 38 is paired with a corresponding channel plate 36. A series of paired divider plates 38 and corresponding channel plates 36 can be secured together to form the horn passageway defined by the horn enclosure 12. In one example, one divider plate 38 will be paired with and fastened to a corresponding adjacent channel plate 36 by securely fastening the upper surface of the divider plate to the lower surface 37 of the corresponding channel plate 36. In this paired configuration, the arcuate openings 62 of the channel plate and arcuate openings 66 of the divider plate have matching shape, size, and position and are substantially aligned as an arcuate opening pair. Similarly, the central inlet section 63 (FIG. 7) of the channel plate and the sound inlet 68 (FIG. 8) of the divider plate also have a matching shape, size, and position and are substantially aligned together.

Each of the plurality of input plenums 20 may also be constructed in a variety of ways. In one example, each input plenum 20 is defined by the driver input openings 44 and the paired arcuate openings 62 and 66 associated the adjacent core plates 34. In one example, a pair of arcuate openings 62 and 66 are positioned relative to the circular driver input opening 44 such that the respective divider plate 38 partially overlaps a portion of the opening 44. Other configurations may also be used where the a portion of the divider plate 38 at least partially overlaps a portion of the circular driver input opening 44.

Figure 9:
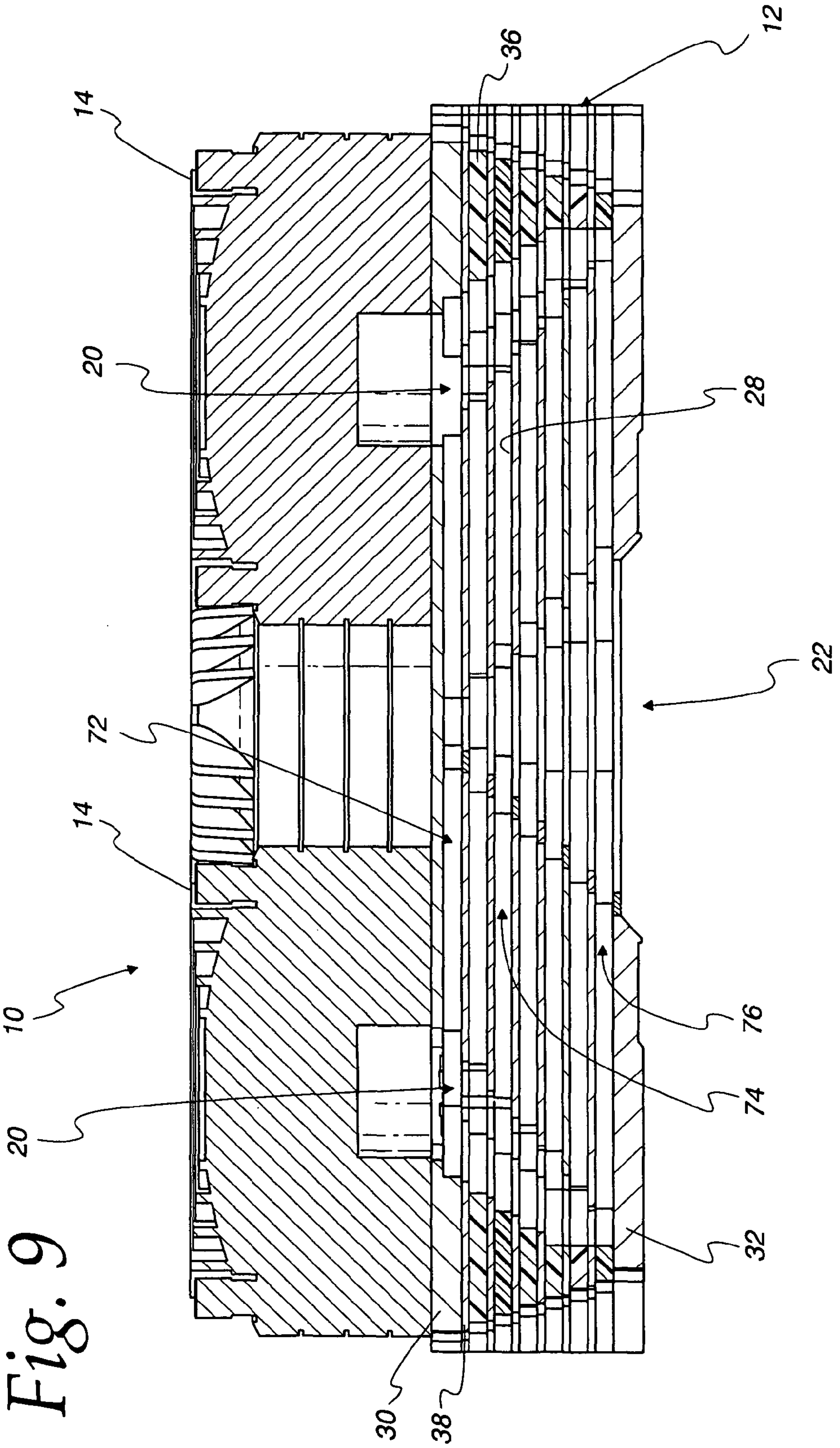
FIG. 9 is a front sectional view, taken along the plane 9-9 of the horn enclosure and multiple acoustic drivers shown in FIG. 1.
Figure 10:
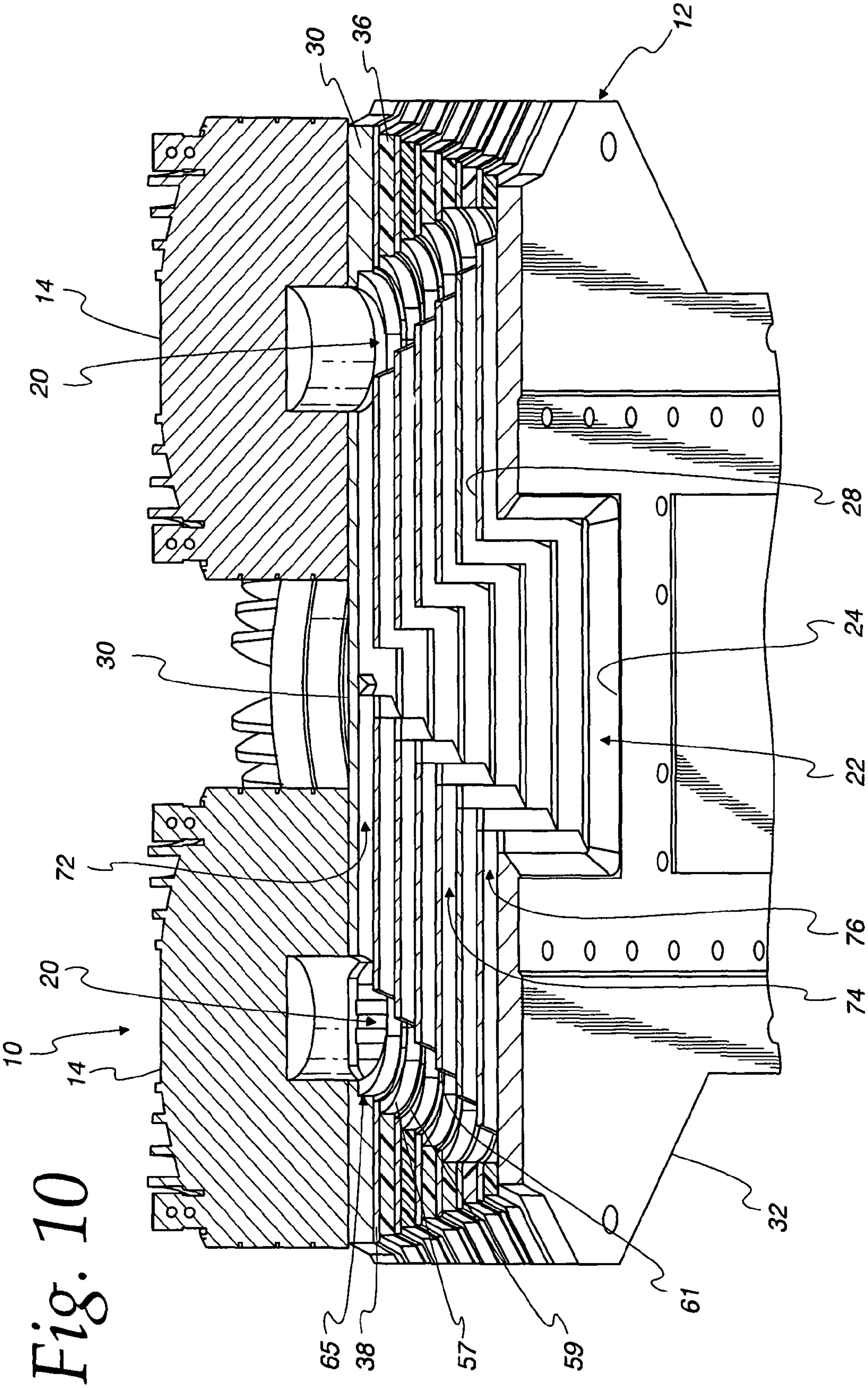
FIG. 10 is a top perspective view of the horn enclosure and multiple acoustic drivers shown in FIG. 9.

The size and shape of each input plenum 20 as well as the lengths of the plurality of acoustic paths will depend on the size, shape, and positioning of each pair of arcuate openings 62 and 66. As shown in FIGS. 9-10, a stepped input plenum 20 configuration is defined as each arcuate opening pair 62 and 66 is sized and positioned such that the lateral edge 61 of the corresponding arcuate opening 66 either partially or fully overlaps the driver input opening 44 and extends a distance past the lateral edge 61 of the adjacent divider plate directly below. In this configuration, the curved portions 57 and 59 of the corresponding arcuate opening pairs 62 and 66 are disposed such that each curved portion 57, 59 extends a distance past the curved portion of the adjacent arcuate opening pair directly below. The immediate result of this configuration is a stepped input plenum 20 that forms openings for flow passageways 28 of various lengths and a chamber wall 65 extending at an angled incline away from the acoustic driver 14 and sound output chamber 22. This angled incline configuration allows sound output traveling along an inner acoustic path to reach the common sound output chamber 22 faster than sound output traveling along an outer acoustic path. As such, this angled incline configuration creates individual acoustic paths having varying lengths.

The sound inlet 68 of the divider plate 38 (FIG. 8) may have various shapes, sizes, positioning, and configurations and may at least partially define the common sound output chamber 22. Portions of sound output traveling along the individual acoustic paths pass through the sound inlet 68 to the common sound output chamber 22 for recombination as the original sound output. In one example, the sound inlet 68 may have a generally rectangular shape and may correspond to the size and shape of the central inlet section 63 of the corresponding channel plate 36 (FIG. 7). In one example, and as shown in FIG. 10, the length and width of the sound inlet 68 of each divider plate 38 may increase for divider plates located closer to the outer sound output layer 22. This configuration defines a sound output chamber 22 having a generally pyramidal shape with walls conforming to a predefined desired angle. The pyramidal shape provides ample room for reconstruction of the sound output and combination with other sound output from the other acoustic drivers. The pyramidal configuration also permits expansion of the sound output as it exits through the sound output opening as a single sound output. In other examples, it should be appreciated that many different configurations and sizes of sound inlets 68 could be used within the horn enclosure 12.

The plurality of flow passageways 28 may be constructed in a variety of ways depending on the configuration of the horn enclosure 12. In one example, a lower flow passageway 72 is defined by outer sound input plate 30 and an adjacent divider plate 38 rigidly secured together. Specifically, the upper input surface 42 of the outer sound input plate is disposed and fastened flush against the lower surface 41 of the divider plate. This arrangement forms the lower flow passageway 72 and provides a portion of an individual acoustic path within the channel grooves 46 of the upper input surface for a portion of the sound output to travel.

In another example, a plurality of middle flow passageways 74 are defined by divider plates 38 and channel plates 36 secured together in a rigid assembly. For example, each one of the plurality of middle flow passageways 74 may be formed by a divider plate 38 and corresponding channel plate 36 pair as well as an adjacent divider plate 38. Specifically, the upper surface of a divider plate is disposed flush against the lower surface 37 of the corresponding channel plate and the lower surface 41 of an adjacent divider plate is disposed flush against the upper surface of the same corresponding channel plate. In this sandwiched configuration, the middle flow passageway 74 is formed by the disposition of the open channel portions 64 of the channel plate 36 and the corresponding and adjacent divider plates 38 to thereby provide a passageway and a portion of an individual acoustic path for a portion of the sound output to travel.

In another example, an upper flow passageway 76 is defined by the outer sound output plate 32, and a divider plate 38 and the corresponding channel plate 36 pair. Specifically, the upper surface of the divider plate is disposed and fastened flush against the lower surface 37 of the channel plate and the upper surface of the channel plate 38 is disposed and fastened flush against the outer sound output plate 32. In this arrangement, the upper flow passageway 76 is formed by the open channel portions 64 of the corresponding channel plate 36 and provides a portion of an individual acoustic path for a portion of the sound output to travel.

In one example, the plurality of acoustic paths may all have the same length. Generally, having a plurality of acoustic paths with the same length creates a combined sound output having a flat or planar wavefront. In other examples, it may be desirable to create a combined sound output having a curved wavefront to provide maximum efficiency between the horn enclosure 12 and the horn mouth portion.

To provide maximum efficiency, the sound reproduction system 10 controls the high frequency radiation pattern exiting the acoustic drivers. In one example, it may be desirable to create a combined sound output having a curved wavefront when emanating into a horn mouth with particular dimensions. Accordingly, the creation of the curved wavefront depends on the horn mouth dimensions and the frequency of the sound output as discussed below. The approximate frequency at which a horn has directivity in its operating range is calculated according to the following formula:

$$F1=K/Ha*Xm,$$

where F1 is the frequency above which the directivity of the horn is set by the horn wall angle, Xm is the horn width in inches at a particular point, Ha is the horn wall angle, measured wall-to-wall for the cross-section at the point of the horn being studied, and K is a constant equal to $10^6$. This formula is obtained from a paper by Don Keeles, presented at the $58^{th}$ Convention of the Audio Engineering Society, and is in reference to the mouth dimension governing a horn's radiation pattern. As the frequency increases, that portion of the horn that sets the radiation angle at that frequency and at the point of interest along the horn passageway grows increasingly close to the horn throat. Accordingly, the goal to obtain constant directivity, or a minimum of internal acoustic reflections, is achieved by making approximately equal the horn wall angles where one horn section joins another, down to a dimension where the F1 frequency is equal to or higher than the highest frequency in the operating range of interest.

If the dimension of the horn mouth and the horn angle are sufficient, this dimension controls the radiation angle in that plane. As the frequency increases, the portion of the horn that governs the radiation pattern moves up the horn closer to the acoustic drivers. At the highest frequencies of interest, the throat dimensions may control the radiation angle. In one example, the source may be small enough that the horn sets the radiation angle. In the example of combining output from multiple drivers, however, the source is generally not small enough to allow the horn to maintain pattern control at the high end. Thus, when combining output from multiple drivers, it is desirable for the horn enclosure to "pre-curve" the wavefront as if it came from an extension of the horn at a smaller dimension. In essence, "pre-curving" the wavefront is creating a virtual throat.

The horn enclosure 12 provides for pre-curving the wavefront to have a spherical segment and therefore providing maximum efficiency between the wavefront and the horn thereby allowing the wavefront to fully fill the horn. As discussed above, one method of "pre-curving" the wavefront is by either increasing or decreasing the lengths of the acoustic paths within the horn enclosure. This increasing or decreasing results in delaying segments of the sound wave as shown in FIG. 11.

Figure 11:
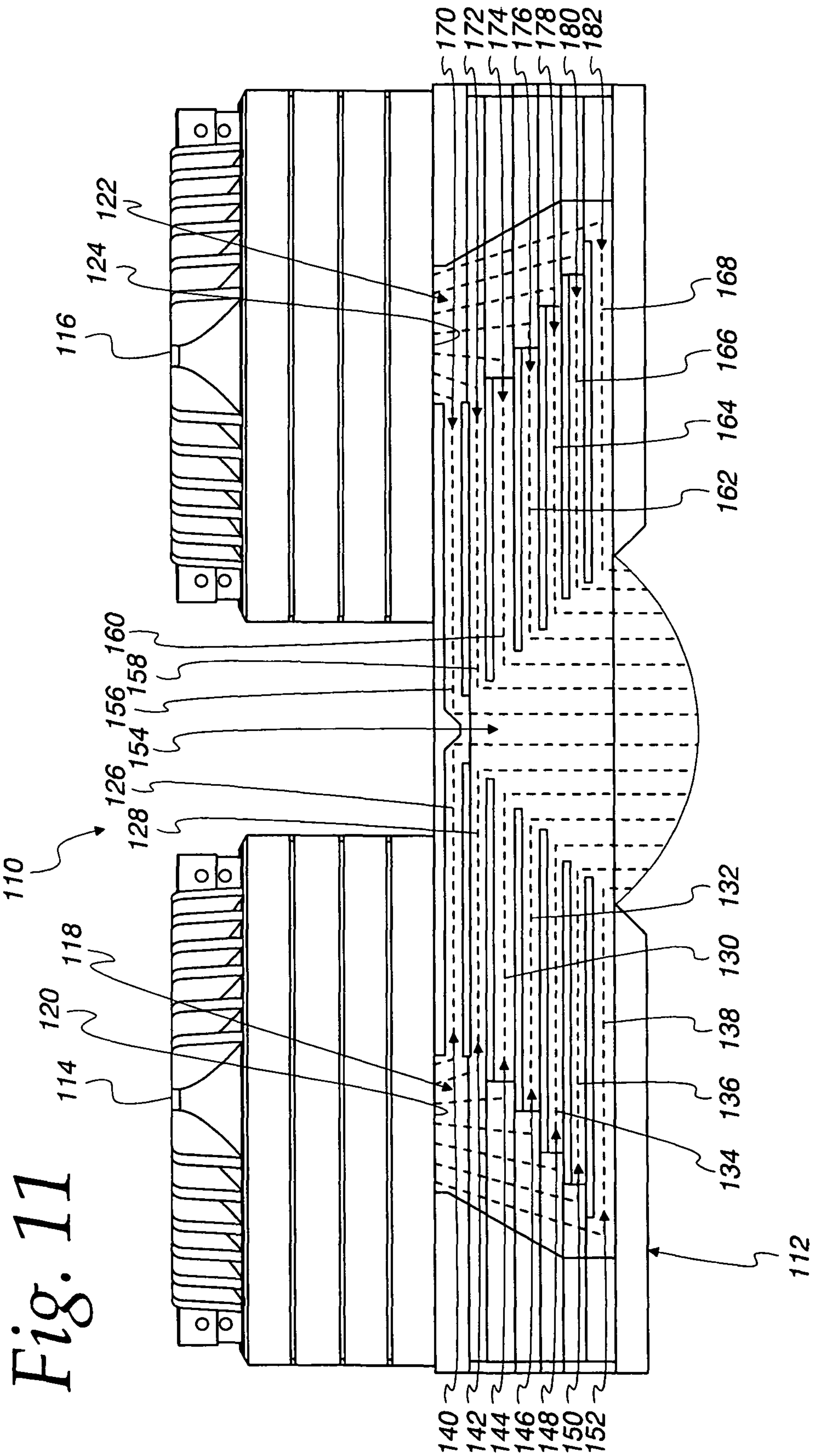
FIG. 11 is a side view of a horn enclosure and multiple acoustic drivers outputting a spherical segment wavefront in accordance with another embodiment of the invention.

By way of example, several exemplary acoustic paths shown in the sound reproduction system 110 of FIG. 11 have different lengths and are used for creating a curved wavefront. In this example, the sound reproduction system 110 includes horn enclosure 112 coupled to acoustic drivers 114 and 116. It is understood that other embodiments may include enclosures coupled to any number of acoustic drivers. In this example, sound output is generated by acoustic driver 114 and enters sound input plenum 118 through driver input opening 120. Sound output is also generated by acoustic driver 116 and enters sound input plenum 122 through driver input opening 124. In this example, horn enclosure 112 includes a plurality of acoustic paths 126, 128, 130, 132, 134, 136, and 138 defined by sound input plenum 118, a plurality of flow passageways 140, 142, 144, 146, 148, 150, and 152, and sound output chamber 154. Horn enclosure 112 also includes a plurality of acoustic paths 156, 158, 160, 162, 164, 166, and 168 defined by sound input plenum 122, a plurality of flow passageways 170, 172, 174, 176, 178, 180, and 182 and sound output chamber 154.

In operation, the sound output progresses away from the acoustic driver 114, enters the input plenum 118, and separates along each individual acoustic path. The separated sound output passes through each of the flow passageways along each respective acoustic path and is distributed into the sound output chamber 154. The separated sound output enters the sound output chamber 154 in the same order it entered each flow passageway at an acoustically small dimension thereby allowing reconstruction of the sound output originally generated by the acoustic driver 114. Sound output generated by acoustic driver 116 follows a similar path and is also reconstructed into the sound output originally generated by acoustic driver 116. The sound output from each respective driver is combined together at the sound output chamber 154 to form a larger sound output and single wavefront. In this example, the sound output from each driver aligns with one another thereby creating a single non-interfering high frequency source from two separate driver sources.

The combined larger sound output formed in FIG. 11 also includes a curved wavefront. As explained above, a the curved wavefront can be created by varying the lengths of each of the individual acoustic paths. For example, the outer acoustic path 138 has the longest length since the corresponding partition substantially overlaps the driver input opening 120 and plenum 118 extends at an angled incline away from the sound output chamber 154. This configuration thereby maximizes the length of acoustic path 138 to the output chamber 154. The portion of the sound output traveling along the acoustic path 138 is, therefore, the last portion to enter the sound output chamber 154 and is the last portion to combine to form the combined wavefront for exiting the sound output chamber 154. In contrast, the inner acoustic path 126 has the shortest length to the sound output chamber 154 since the corresponding partition only minimally overlaps the driver input opening 120 thereby minimizing the length of the acoustic path 126. The portion of sound output traveling along the acoustic path 126 is, therefore, the first portion to enter the sound output chamber 154 and is the first portion to combine to form the combined wavefront exiting the sound output chamber 154. Similarly, the lengths of the other plurality of acoustic paths can be adjusted depending on the overlap of the corresponding partitions with the driver input opening 120 and the inclined angle of the input plenum 118. As such, the various portions of the sound output travel along the respective acoustic paths and enter the sound output chamber 154 at different times so as to combine to form a curved wavefront.

Figure 12:
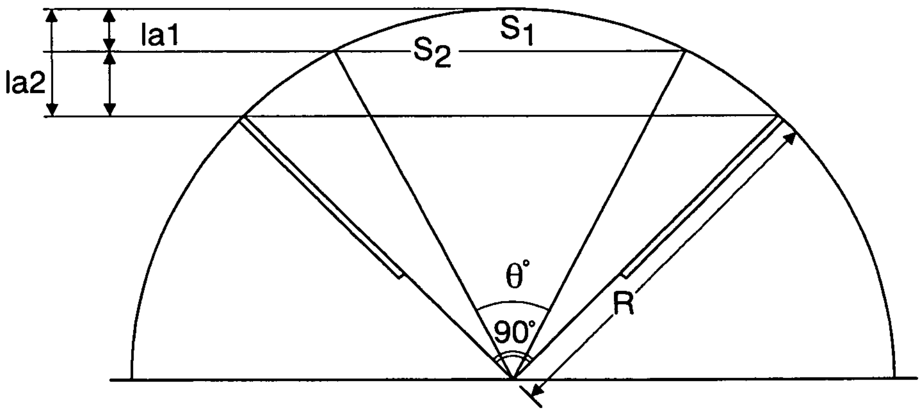
FIG. 12 is a graphical diagram showing a formula for maximizing efficiency between the outputted wavefront and the angle of the horn.

In another example, the lengths of the plurality of acoustic paths may be varied by adjusting the lengths of the plurality of flow passageways. In this example, the input plenum includes a chamber wall being generally perpendicular to each of the plurality of flow passageways. The length of each of the plurality of acoustic paths is, therefore, dependent on the length of each of the plurality of flow passageways. A graphical display shown in FIG. 12 indicates the desired lengths of a particular flow passageway necessary to provide a curved wavefront that can fill a conical horn with little to no pattern loss. As such, the wavefront is configured to exit the horn in an arc that is a portion of a circle having a radius R which is the same radius also for the segment of the sphere. As shown in FIG. 12, $S_1$ is a smaller segment of a circle having a radius R and $S_2$ is a larger segment of the circle having the radius R.

Thus, the geometric expression for the ideal configuration would be:

$$l_n = l_1 + l_a,$$

where $l_n$ is the total length of the passageway, $l_1$ is the shortest passageway in the enclosure, and $l_a$ is represented by the formula $$l_a = R(1-\cos(\Theta°/2)),$$

where R represents the radius of curvature of the arc and theta represents the included angle as determined by the spacing of the partitions.

As an example, the shortest passageway would have an angle Θ equal to zero degrees such that:

$$l_n = l_1 + R(1-\cos 0/2)$$

$$l_n = l_1 + R(1-1) = l_1 + R(0) = l_1$$

If the maximum included angle, as determined by horn dimensions, happened to be 90 degrees and there are five separate paths, then $$l_5 = l_1 + R(1-\cos 90/2)$$

$$l_5 = l_1 + R(1-0.707)$$

$$l_5 = l_1 + 0.293R$$

In this example, it is therefore possible to formulaically determine the lengths of each of the plurality of flow passageways for creating a curved wavefront to fill the horn mouth portion with little or no interference.

In the embodiments discussed above, the layers of the enclosure are formed having a nominal thickness of about 1.5 inches. The openings in other layers are scaled accordingly, as illustrated. Other arrangements are, of course, possible. The layers are preferably securely fastened together to prevent unwanted energy absorption, rattles, noises, etc. If desired, other numbers of layers may be employed.

Figure 13:
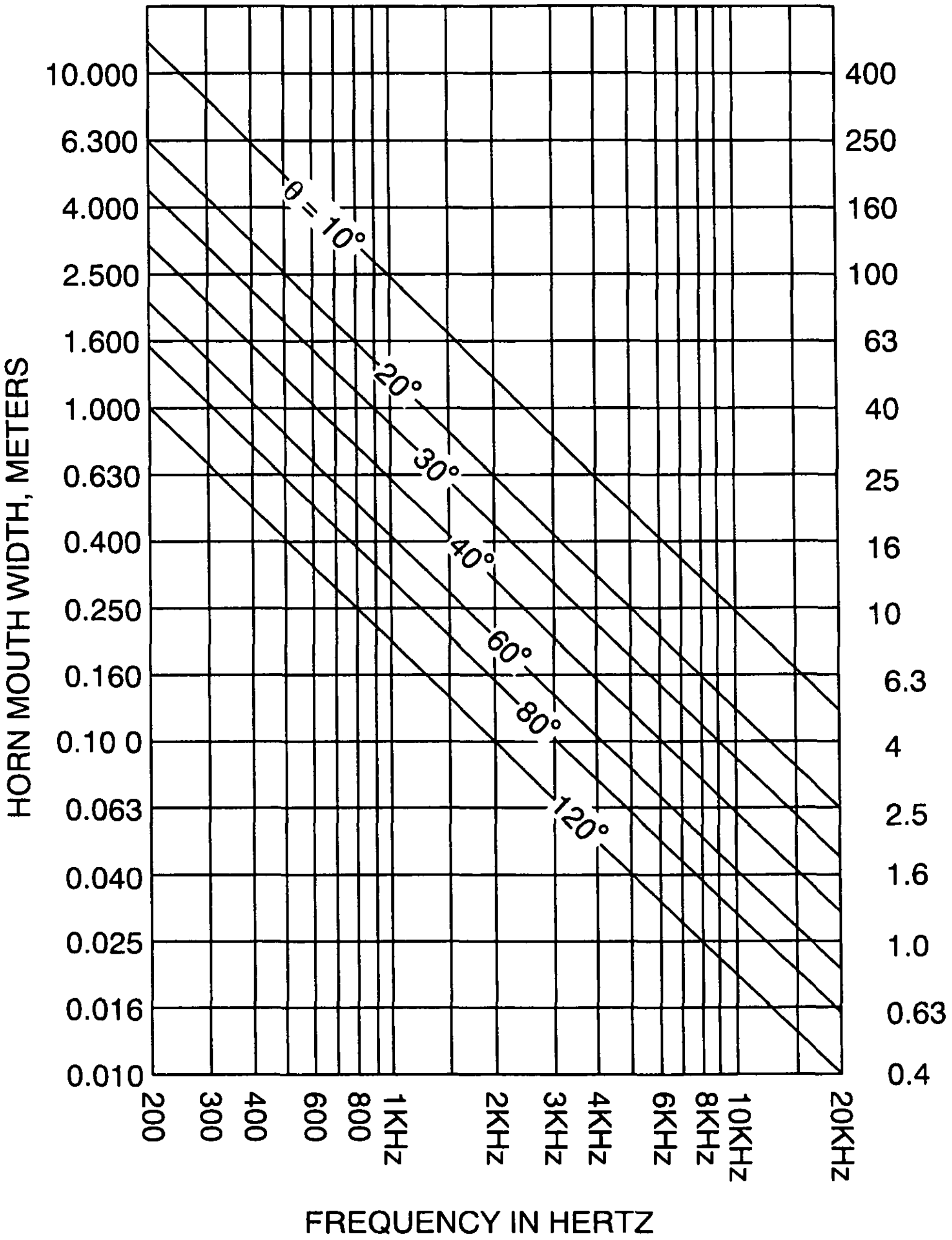
FIG. 13 is a graphical diagram showing pattern loss angle and frequency for a given horn mouth width.

As noted herein above, it is important to provide the proper wavefront curvature when the width and angle at the entrance are such that they govern the radiation pattern of the wavefront. The graph in FIG. 13 shows the pattern loss angle and frequency for a given horn mouth width. In one example, the width of exit of the sound output opening 24 is 4 inches and is intended for use with a horn having a 90° horn wall angle in the horizontal plane. As shown on the graph, the frequency of 2800 HZ is the frequency where the output opening 24 dimension of 4 inches would allow for a 90° horn wall angle.

For frequencies above 2800 HZ, the wavefront must already be curved as if it originated further back in a smaller part of the horn. As shown in the graph in FIG. 13, a 20 KHz outputted wavefront can only fill out a 12° horn. Thus, to fill a 90° horn, it must be curved as if it came from a minimum of a 78° horn.

The lengths of the acoustic paths may vary to provide the desired delay in forming the spherical segment wavefront. The horn enclosure 12 shown in FIG. 1 is, in one embodiment, realized in a horn enclosure that allows one to assign a predefined exit wavefront curvature to output from the enclosure 12, by adjusting the configuration of the plurality of adjacent core plates 24.

While it is shown that one construction could be made out of flat layers of plates, the time or path length adjustment in the lateral path could be done in a number of other ways. For example, open cell metal foam, a series of bends, zig zags or wavers having straight lines or obstructions, all could be used to make the acoustic path longer than the direct straight line physical path.

The foregoing description and the accompanying drawings are illustrative of the present invention. Still other variations in arrangements of parts are possible without departing from the spirit and scope of this invention.

I claim:

1. Enclosure for combining sound output emanating from a plurality of acoustic drivers, comprising:
- a sound input plenum defined by the enclosure associated with each one of the plurality of acoustic drivers and adapted to receive sound output from the associated driver;
- a plurality of parallel partitions in the enclosure defining a plurality of flow passageways providing a plurality of acoustic paths from each driver through the plenum; and
- a common sound output chamber defined by the enclosure, in communication with each plenum through respective flow passageways, and having a sound output opening;
- wherein the sound input plenum, the respective flow passageways, and the sound output chamber define a horn passageway from each of the acoustic drivers; and
- wherein the sound input plenum and respective flow passageways are arranged to provide a plurality of acoustic paths of uneven length from the associated driver.

2. The enclosure of claim 1 wherein the plurality of acoustic paths merge to exit the common sound output chamber as a single wavefront.

3. The enclosure of claim 2 wherein the single sound wavefront is a curved wavefront.

4. The enclosure of claim 2 wherein the single wavefront exiting from the sound output chamber is in the form of a spherical segment.

5. The enclosure of claim 1 wherein each of the plurality of acoustic paths has a length $l_n$ represented by $l_n = {}_l + l_a$, wherein $l_l$ is the length of the shortest acoustic path and $l_a = R(1 - \cos(\Theta°/2))$, wherein R is a radius of a curved wavefront exiting the common sound output chamber, wherein Θ is an angle of sound output between each of the plurality of acoustic paths.

6. A horn enclosure for combining sound output emanating from a plurality of acoustic drivers, comprising:
- a plurality of adjacent core plates, each core plate having a cutout portion; and
- an outer sound input plate defined by the horn enclosure having sound input openings and an outer sound output plate defined by the horn enclosure having a sound output opening, spaced apart by the plurality of adjacent core plates;
- wherein the plurality of adjacent core plates are secured with the outer input plate and the outer sound output plate to form a rigid assembly.

7. The horn enclosure of claim 6 wherein the outer sound input plate and outer sound output plate are integral with the plurality of adjacent core plates.

8. The horn enclosure of claim 6 wherein the plurality of adjacent core plates includes a plurality of channel plates, the cutout portion of each channel plate having a trifoliate configuration for acoustic communication with the plurality of acoustic drivers and a plurality of divider plates, the cutout portion of each divider plate having a plurality of arcuate openings and a sound inlet opening.

9. The horn enclosure of claim 8 wherein the plurality of channel plates and the plurality of divider plates are disposed in an alternating configuration defining a plurality of sound input plenums and a common sound output chamber, each of the sound input plenums in acoustic communication with the common sound output chamber by a plurality of flow passageways.

10. The horn enclosure of claim 6 wherein the plurality of arcuate openings each define a sound input plenum and the sound inlet opening defines a common sound output chamber in communication with the sound input plenum through a plurality of flow passageways.

11. The horn enclosure of claim 6 wherein the sound output is combined to exit the sound output opening as a curved wavefront.

12. A system for reproducing sound, comprising:
- a sound enclosure defining a horn passageway defining input openings for at least two acoustic drivers and a common sound output opening;
- an acoustic driver coupled to each input opening; and
- the common sound output opening adapted to output a combined sound output to a horn mouth region;
- wherein the sound enclosure is provided with a plurality of partitions that define plural independent acoustic pathways from each acoustic driver;
- wherein the sound enclosure further defines a sound output chamber for merging the independent acoustic pathways to form the combined sound output; and
- wherein the plural independent acoustic pathways associated with each acoustic driver are an unequal length and upon merging provide a curved wavefront.

13. The system of claim 12 wherein the sound enclosure further comprises a plurality of sound input plenums, each of the sound input plenums in acoustic communication with the sound output chamber by a plurality of flow passageways.

14. The system of claim 13 wherein each of the plural independent acoustic pathways are further defined by each sound input plenum and the plurality of flow passageways.

15. A method for generating a curved sound wavefront for a horn comprising:
- providing at least two acoustic drivers; and
- separating output from each acoustic driver into plural acoustic paths of unequal length from each acoustic driver and thereafter combining matching acoustic paths to form a curved sound wavefront as input to the horn.

16. The method of claim 15 wherein combining of the matching acoustic paths further includes merging the matching acoustic paths at a sound output chamber to form a single sound wavefront.

* * * * *